No. 841,512. PATENTED JAN. 15, 1907.
F. S. GUNNING.
COMBINED HARROW TOOTH AND WEEDER.
APPLICATION FILED FEB. 12, 1906.
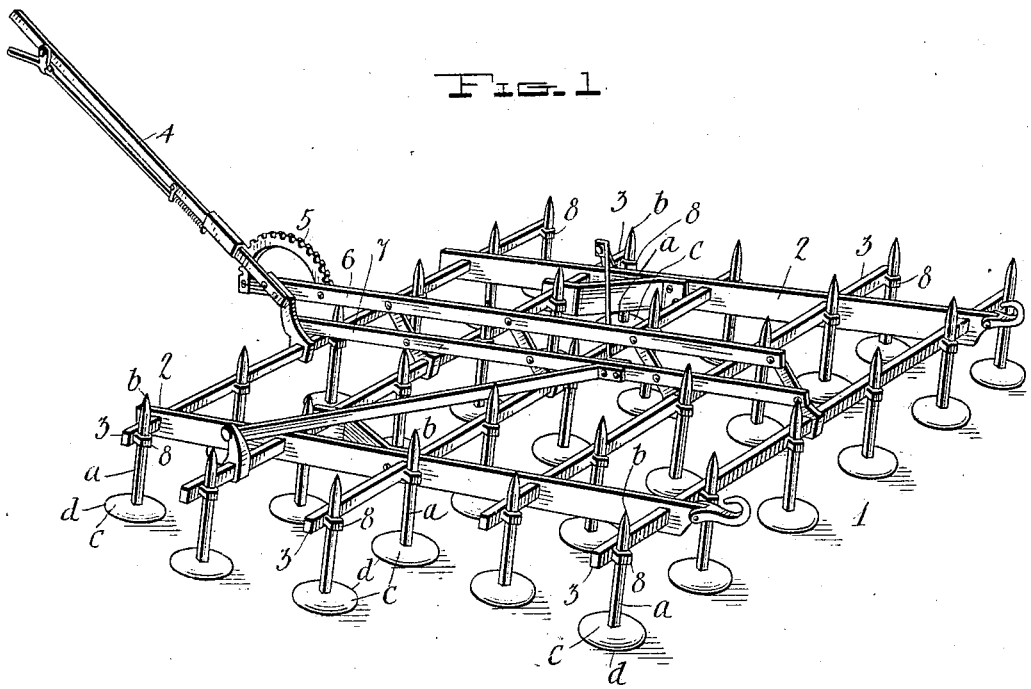
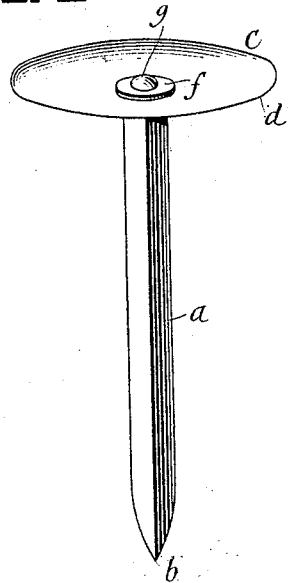
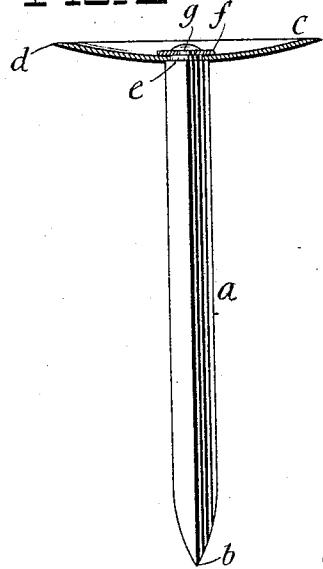
Witnesses
Inventor
F. S. Gunning

UNITED STATES PATENT OFFICE.

FRANK S. GUNNING, OF THE DALLES, OREGON.

COMBINED HARROW-TOOTH AND WEEDER.

No. 841,512. Specification of Letters Patent. Patented Jan. 15, 1907.

Application filed February 12, 1906. Serial No. 300,659.

*To all whom it may concern:*

Be it known that I, FRANK S. GUNNING, a citizen of the United States, residing at The Dalles, in the county of Wasco and State of Oregon, have invented certain new and useful Improvements in a Combined Harrow-Tooth and Weeder; and I do declare the following to be a full, clear, and exact description of the invention, such as will enable others skilled in the art to which it appertains to make and use the same.

This invention relates to a combined harrow-tooth and weeder, and one of the principal objects of the same is to provide a combined harrow-tooth and rotary disk weeder which may be attached to any suitable type of harrow-frame and which may be quickly adjusted for either serving as a harrow or as a weeder.

Another object is to provide a simple attachment for an ordinary harrow which will effectually destroy weeds and which will be self-cleaning in operation.

These and other objects are attained by means of the construction illustrated in the accompanying drawings, in which—

Figure 1 is a perspective view of a harrow provided with my improved reversible harrow-tooth and weeder. Fig. 2 is a perspective view of the combined tooth and weeder attachment, and Fig. 3 is a detail sectional view taken through the weeder-disk and the shank of the tooth at its point of attachment thereto.

Referring to the drawings for a more particular description of my invention, the numeral 1 designates a harrow-frame comprising the longitudinal bars 2, the transverse tooth-bars 3 mounted to rock in the longitudinal bars, the lever 4, the rack 5, and the rocking bars 6 7. This harrow-frame may be of the usual or any preferred type, preferably provided with means for rocking or tilting the tooth-bars. The tooth-clamps 8 may also be of the usual or any preferred type provided with means for clamping a rectangular tooth to the harrow-bar.

My improved harrow-tooth and weeder comprises a rectangular shank $a$, pointed at one end, as at $b$, to form a harrow-tooth and provided at its opposite end with a weeder-disk or cutter $c$, said disk being slightly concavo-convex and provided with a cutting edge $d$, said disk being mounted to freely rotate upon a reduced and rounded portion $e$ of the tooth and held in place by means of a washer $f$, fitted to a still further reduced portion $g$ and secured in place by suitable means, such as by heading up the terminal end of the reduced portion, as shown in the drawings.

With the combined harrow-tooth and weeder, improved in accordance with my invention, the teeth may be quickly reversed for use either as a harrow or as a weeder. When used as a weeder, the disks may be tilted at the required angle by the lever on the harrow-frame to enter the ground at the required angle, depending upon the condition of the ground and the character of work to be done. The disks freely revolve upon the shank of the tooth, and are thus self-cleaning.

From the foregoing it will be obvious that with but slight additional expense a harrow-tooth may be provided with a weeder attachment and the same harrow-frame may be utilized to convert the device from a harrow to a weeder.

Under certain conditions of the ground it may be desirable to adjust the weeder-disks at the required distance from the bars of the harrow-frame to limit the penetration of the disks within the ground by means of the harrow-frame resting on top of the ground while at work.

Having thus described my invention, what I claim as new, and desire to secure by Letters Patent, is—

A combined harrow-tooth and weeder comprising a shank of rectangular cross-section and adapted to be clamped to a harrow-frame, said shank being pointed at one end, and a weeder-disk mounted to rotate upon the opposite end, said shank adapted to be reversed in the frame to serve as a harrow-tooth or weeder, substantially as described.

In testimony whereof I have hereunto set my hand in presence of two subscribing witnesses.

FRANK S. GUNNING.

Witnesses:
J. A. DOUTHIT,
ROSE D. MICHELL.